United States Patent
Sung

(10) Patent No.: US 7,796,562 B2
(45) Date of Patent: Sep. 14, 2010

(54) APPARATUS AND METHOD FOR DETERMINING A SEARCH SET FOR RESOURCE ALLOCATION IN A MULTI-ANTENNA SYSTEM

(75) Inventor: Joon-Hyun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 768 days.

(21) Appl. No.: 11/713,845

(22) Filed: Mar. 5, 2007

(65) Prior Publication Data

US 2007/0211666 A1    Sep. 13, 2007

(30) Foreign Application Priority Data

Mar. 4, 2006    (KR)    ........................ 10-2006-0020737

(51) Int. Cl.
*H04B 7/00*    (2006.01)
(52) U.S. Cl. ........................ 370/334; 370/310; 370/328; 370/329; 455/450; 455/464
(58) Field of Classification Search ................. 370/334, 370/310, 328, 329, 331, 332, 338; 455/464, 455/509, 422.1–460, 524–525
See application file for complete search history.

(56) References Cited

U.S. PATENT DOCUMENTS

| 2003/0086405 | A1* | 5/2003 | Silva et al. | 370/342 |
| 2006/0023667 | A1* | 2/2006 | Tanabe et al. | 370/334 |
| 2007/0071127 | A1* | 3/2007 | Gore et al. | 375/267 |

* cited by examiner

*Primary Examiner*—Kamran Afshar
*Assistant Examiner*—Marisol Fahnert
(74) *Attorney, Agent, or Firm*—NSIP Law

(57) ABSTRACT

An apparatus and method for generating a reduced search set to be used to determine a data transmission rate to be allocated to each antenna in a spatial multiplexing system for simultaneously transmitting independent data streams on an antenna-by-antenna basis. Channel states are estimated with respect to multiple transmit antennas and multiple receive antennas. Data transmission rates constructing a reduced search set are computed using information regarding the estimated channel states. When the reduced search set is designated, data transmission allocation is determined which requires least energy in the reduced search set. A receiving side provides a transmitting side with index information indicating the reduced search set.

11 Claims, 5 Drawing Sheets

APPARATUS AND METHOD FOR DETERMINING A SEARCH SET FOR RESOURCE ALLOCATION IN A MULTI-ANTENNA SYSTEM

PRIORITY

This application claims priority under 35 U.S.C. §119(a) to a Korean Patent Application filed in the Korean Intellectual Property Office on Mar. 4, 2006 and assigned Serial No. 2006-20737, the entire disclosure of which is incorporated herein by reference.

BACKGROUND OF THE INVENTION

1. Field of the Invention

The present invention generally relates to an apparatus and method for determining a search set for resource allocation in a multi-antenna system, and more particularly to an apparatus and method for generating a reduced search set to be used to determine a data transmission rate to be allocated to each antenna.

2. Description of the Related Art

Wireless mobile communication markets are rapidly growing. Various multimedia services are required in wireless environments. Efforts are in progress to provide high-speed, large-capacity data transmission. For this, the most urgent problem is to find a method for efficient use of limited frequency. To address this problem, a new transmission technology using multiple antennas is required.

As a representative example of the new transmission technology using the multiple antennas, a multiple-input multiple-output (MIMO) system has been proposed. The MIMO system requires an efficient signal processing algorithm for providing a high-quality data service at a high transmission rate.

An example of the signal-processing algorithm is a resource allocation algorithm. The resource allocation algorithm allocates resources, that is, data transmission rates, on an antenna-by-antenna basis to achieve a target error rate while minimizing resource consumption. The resource allocation algorithm may be divided into signal processing algorithms at a transmitting side and a receiving side. When the data transmission rates are allocated on the antenna-by-antenna basis, the transmitting side finds resource allocation in which the target error rate can be achieved while minimizing energy consumption.

Existing resource allocation algorithms are uniform allocation, fixed allocation and full-search allocation.

The uniform allocation scheme allocates the same data transmission rate on an antenna-by-antenna basis. This is the simplest resource allocation scheme in which feedback information transmission is unnecessary. However, there is a disadvantage in that performance is inferior since the error rate is high even when Successive Interference Cancellation (SIC) as well as linear detection is used.

The fixed allocation scheme designates optimal allocation and uses the designated allocation for all channels. The optimal allocation is determined by channel statistics. If the channel statistics are useful, the fixed allocation scheme outperforms the uniform allocation scheme. However, error rate performance may be limited since allocation is fixed and also the fixed allocation does not stably operate under varied channel conditions.

The full-search allocation scheme uses all available combinations as candidates for data transmission rate allocation. Among the candidates, a candidate requiring the lowest power is used for allocation to a current channel. This scheme exhibits the best performance since all cases are considered. However, the full-search allocation scheme is disadvantageous in that complexity and feedback information increase. To reduce the complexity in the full-search allocation scheme, an iterative algorithm has been proposed.

The signal-processing algorithm at the receiving side detects the channel's state of each transmission channel and feeds back the detection result to the transmitting side. On the basis of the detection result fed back from the receiving side, the signal processing algorithm at the transmitting side allocates resources on a transmit (Tx) antenna-by-Tx antenna basis.

The Bell Labs Layered Space Time (BLAST) technology is a representative example of the signal-processing algorithm. The BLAST technology may increase a data transmission amount using multiple antennas without increasing the frequency domain to be used by a system.

This BLAST technology is divided into diagonal-BLAST (D-BLAST) and vertical-BLAST. D-BLAST may achieve high spectral efficiency using specified block coding between data to be transmitted from Tx antennas for a diagonal transmission, but has the drawback in that implementation complexity is high. However, V-BLAST may reduce the complexity by independently transmitting data from the Tx antennas.

Moreover, the signal-processing algorithm at the receiving side is used to detect signals transmitted from Tx antennas using received signals. The signal-processing algorithm at the receiving side may be divided into a linear detection scheme and a non-linear detection scheme.

The Zero Forcing (ZF) technique and Minimum Mean Square Error (MMSE) technique are examples of the linear detection scheme.

The ZF technique eliminates intersymbol interference by computing criteria with respect to column vectors, detecting a signal component from a symbol mapped to a column vector with largest magnitude and eliminating the detected signal component from a received signal. The MMSE technique minimizes the mean square error between the original transmitted symbols and estimated signals at the receiving side.

The Maximum Likelihood (ML) detection technique and the SIC technique are examples of the non-linear detection scheme.

The ML technique may significantly improve performance by selecting an input with a minimum squared Euclidean distance using all possible transmitted symbols from Tx antennas. However, complexity may exponentially increase according to the number of Tx antennas and modulation order. The ML technique exhibits the best performance, but has a drawback in that implementation is complex due to an increase in the computation amount.

The SIC technique is an interference cancellation technique for improving performance by first detecting and eliminating a channel with a high Signal to Interference plus Noise Ratio (SINR). The SIC technique additionally requires ordering to achieve the best performance.

For performance improvement of the MIMO system as described above, improved signal detection and resource allocation methods are required which can correctly detect a transmitted signal from a received signal and can avoid the increase in computation amount.

SUMMARY OF THE INVENTION

An aspect of exemplary embodiments of the present invention is to address at least the above problems and/or disadvantages and to provide at least the advantages described below. Accordingly, the present invention provides a resource allocation apparatus and method characterized by low complexity and superior error rate performance through simple feedback information using channel characteristics in a Multiple-Input Multiple-Output (MIMO) system.

An aspect of exemplary embodiments of the present invention is to provide an apparatus and method for configuring a reduced search set with the best performance from a full-search set.

An aspect of exemplary embodiments of the present invention is to provide an apparatus and method for allocating transmission stage resources using a reduced search set.

An aspect of exemplary embodiments of the present invention is to provide a resource allocation apparatus and method based on a reduced search set using characteristics of Successive Interference Cancellation (SIC) technique.

An aspect of exemplary embodiments of the present invention is to provide a resource allocation method and apparatus that can provide error rate performance approaching that of a full-search scheme while providing lower complexity than the full-search scheme.

An aspect of exemplary embodiments of the present invention is to provide a resource allocation method and apparatus that can outperform fixed allocation scheme with respect to a channel variation.

In accordance with the present invention, there is provided a method for generating a reduced search set in a spatial multiplexing system for simultaneously transmitting independent data streams on an antenna-by-antenna basis, including estimating channel states with respect to multiple transmit antennas and multiple receive antennas; computing energy values required for all assignable data transmission rates on a basis of the estimated channel states; generating a reduced search set based on the designated number of data transmission rates in ascending order of energy values among smallest energy values determined according to the data transmission rates when the number of data transmission rates constructing the reduced search set is designated; allocating resources on a transmit antenna-by-transmit antenna basis using the generated reduced search set; and providing a transmitting side with index information indicating the generated reduced search set.

In accordance with the present invention, there is provided an apparatus for generating a reduced search set in a spatial multiplexing system for simultaneously transmitting independent data streams on an antenna-by-antenna basis, including a channel estimator for estimating channel states with respect to multiple transmit antennas and multiple receive antennas; a detection sequence determination section for computing energy values required for all assignable data transmission rates on a basis of the estimated channel states; a search set determination section for generating a reduced search set based on the designated number of data transmission rates in ascending order of energy values among smallest energy values determined according to the data transmission rates when the number of data transmission rates constructing the reduced search set is designated; and a resource allocator for allocating resources on a transmit antenna-by-transmit antenna basis using the generated reduced search set, wherein index information indicating the generated reduced search set is transmitted to a transmitting side.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF PREFERRED EMBODIMENTS

Exemplary embodiments of the present invention will be described in detail herein below with reference to the accompanying drawings.

In exemplary embodiments of the present invention, a signal detection method and apparatus for use in a Multiple-Input Multiple-Output (MIMO) system will be described. The MIMO system can include a transmitter for transmitting signals via K transmit (Tx) antennas and a receiver for receiving the signals via L receive (Rx) antennas whose number is less than or equal to the number of Tx antennas. It is assumed that spatial multiplexing transmission technology is used to transmit independent data streams via the Tx antennas.

Figure 1:
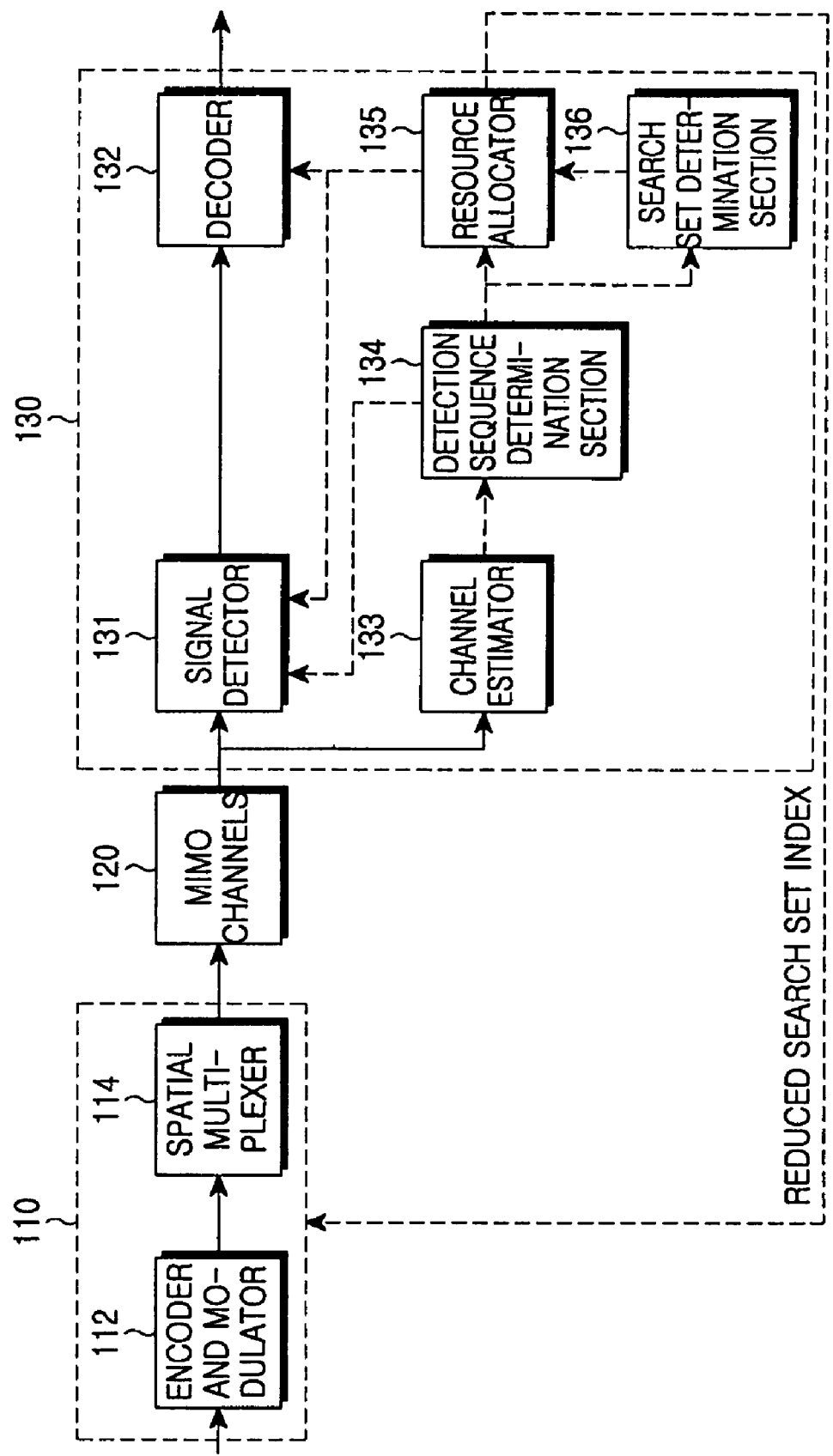
FIG. 1 is a block diagram illustrating the structure of a transceiver in accordance with the present invention.
Figure 2:
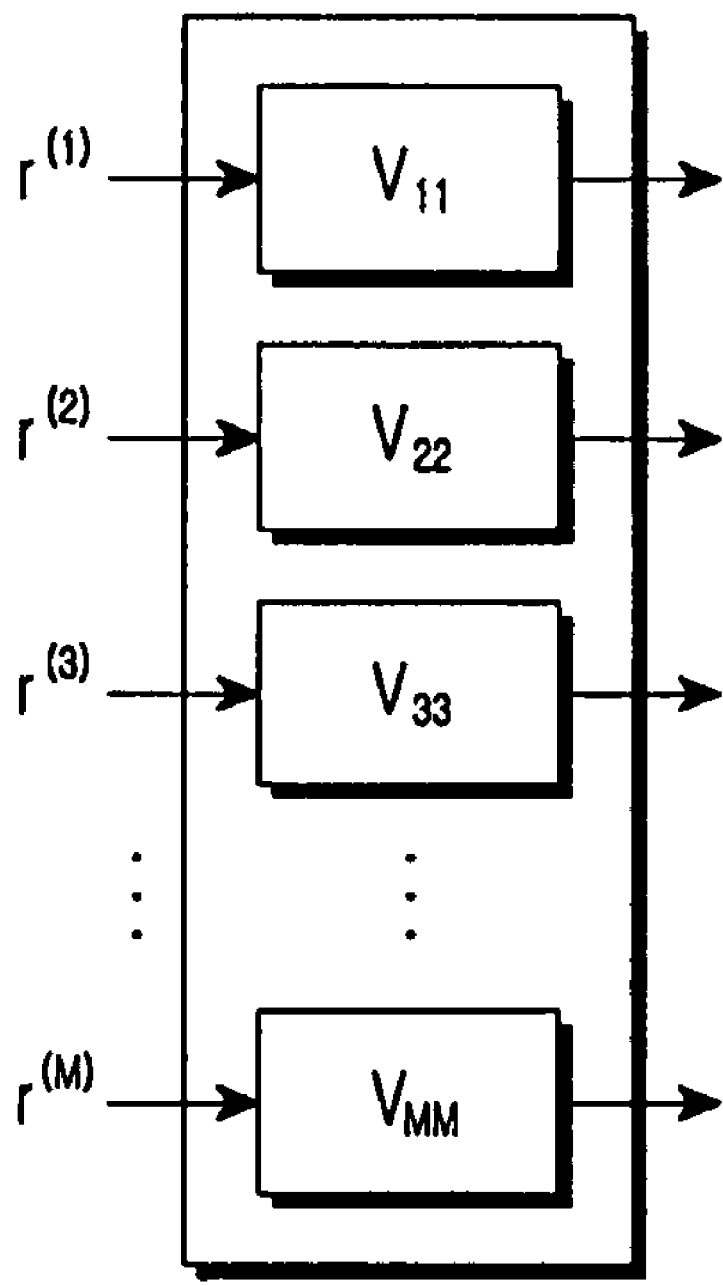
FIG. 2 illustrates allocation of data transmission rates on an effective channel-by-effective channel basis.

Referring to FIG. 1, the transceiver uses MIMO channels on which independent data streams are transmitted. As illustrated in FIG. 1, a transmitter 110 can be constructed with an encoder and modulator 112 and a spatial multiplexer 114. Transmitter 110 determines a reduced search set to be used on the basis of an index of the reduced search set provided from a receiver 130. The reduced search set is used to determine the data transmission rate to be allocated to each antenna. Referring to FIG. 2, it is assumed that M effective channels are provided. The allocated data transmission rates can be expressed by $r = \{r^{(1)}, r^{(2)}, \ldots, r^{(M)}\}$, where $r^{(m)}$ denotes a data transmission rate allocated to the m-th Tx antenna.

The data transmission rate to be allocated to each Tx antenna is determined by the reduced search set. Encoder and Modulator 112 determine a constellation and an error control code on the basis of the data transmission rate of each Tx antenna. That is, the modulation scheme and the code rate for an encoding process are determined. The modulation scheme capable of being determined by the data transmission rate can use one of binary phase shift keying (BPSK), quadrature phase shift keying (QPSK), 16 quadrature amplitude modulation (16QAM) and 64QAM.

Encoder and Modulator 112 encode data to be transmitted on each Tx antenna at the determined code rate. Bit streams encoded on a Tx antenna-by-Tx antenna basis are modulated using the determined modulation scheme. Modulated symbol streams to be output from the Tx antennas are provided to spatial multiplexer 114.

Spatial multiplexer 114 spatially multiplexes the modulated symbol streams. The spatially multiplexed modulated symbol streams are transmitted via the Tx antennas. Receiver 130 receives signals transmitted from the Tx antennas via MIMO channels 120.

Receiver 130 decodes the signals received via MIMO channels 120 and then outputs the decoded signals. Receiver 130 can be constructed with a signal detector 131, a decoder 132, a channel estimator 133, a detection sequence determination section 134, a resource allocator 135, and a search set determination section 136.

The signals received on an Rx antenna-by-Rx antenna basis are input to signal detector 131. Signal detector 131 detects the signals received on the Rx antenna-by-Rx antenna basis and then outputs the detected signals. For this, detection sequence information and resource allocation information can be provided to signal detector 131. For example, signal detector 131 can be implemented with a successive interference cancellation (SIC) technique. When the received signals are expressed by a matrix, the SIC technique performs a nulling process for lower elements on a diagonal basis and applies the cancellation algorithm to upper elements. The SIC technique can improve reliability while reducing complexity.

The signals detected by signal detector 131 are input to decoder 132. Decoder 132 demodulates the received signals and decodes demodulated encoded bit streams. The demodulation process is mapped to the modulation scheme used in transmitter 110. The decoding process is mapped to the encoding process performed in transmitter 110. For this, the resource allocation information can be provided to decoder 132.

The received signals output from signal detector 131 are input to channel estimator 133. Channel estimator 133 measures channel states of MIMO channels 120 from the input received signals. Channel information of the channels estimated by channel estimator 133 is provided to detection sequence determination section 134. Detection sequence determination section 134. determines a detection sequence in which signal detector 131 performs the cancellation algorithm and then provides information regarding the detection sequence to signal detector 131. An energy value mapped to each data transmission rate should be computed to determine the detection sequence. When a reduced search set is designated, data transmission rate allocation requiring the least energy is determined in the reduced search set. Energy values computed for data transmission rates are provided to search set determination section 136 and resource allocator 135.

For example, a set of all data transmission rates for computing the energy values, that is, a full-search set can be defined by $S = \{r_1, r_2, \ldots, r_K\}$, where K denotes the number of all assignable data transmission rates. Energy required at each data transmission rate constructing the full-search set can be computed by $$e_k = \Gamma \cdot \sum_{m=1}^{M} \left(2^{r_k^{(m)}} - 1\right) / v_{mm}^2,$$

where $\Gamma$ is a constant determining a signal to noise ratio (SNR) gain and noise variation, $r^{(m)}$ is a data transmission rate allocated to an m -th Tx antenna, and $v_{mm}$ is an over-the-air transmission rate.

Detection sequence determination section 134 selects the smallest energy value from among the computed energy values mapped to the data transmission rates. Detection sequence determination section 134 provides resource allocator 135 and search set determination section 136 with the smallest energy value selected at each data transmission rate.

Search set determination section 136 determines data transmission rates to be used, that is, K. When one data transmission rate is used, K is set to 1. When two data transmission rates are used, K is set to 2. If K is set to 1, it is the same as the way that the fixed allocation scheme is applied, but is only different from the fixed allocation scheme in that optimal energy efficiency can be achieved in a current channel environment. If K is set to 2, a binary search scheme is applied.

Search set determination section 136 determines a reduced search set constructed with K data transmission rates. For example, if K is set to 1, the reduced search set is constructed with the data transmission rate having the smallest energy value of energy values provided from detection sequence determination section 134. If K is set to 2, combinations of all data transmission rates constructing the full-search set are checked. At this time, the combination can be a reduced search set $S \in \{r_1, r_2\}$ constructed with two data transmission rates. Mean energy values of the combinations are computed and the combination with the smallest mean value of the mean energy values is set to an optimal reduced search set. The optimal reduced search set can be determined by Equation (1).

$$E[e_1 | e_1 < e_2] + E[e_2 | e_1 > e_2] \tag{1}$$

If the optimal reduced search set is determined, search set determination section 136 provides resource allocator 135 with the optimal reduced search set.

Resource allocator 135 determines the data transmission rate to be used from the optimal reduced search set $S \in \{r_1, r_2\}$. The data transmission rate to be used is determined by applying a rule proposed in Equation (2).

$$r_1 \text{ if } e_1 < e_2$$

$$r_2 \text{ if } e_1 > e_2 \tag{2}$$

Using Equation (2), the data transmission rate with the smallest energy value of energy values of data transmission rates constructing the optimal reduced search set is selected.

Resource allocator 135 provides transmitter 110 with an index mapped to the optimal reduced search set. Also, the selected data transmission rate is provided to signal detector 131 and decoder 132.

Figure 3:
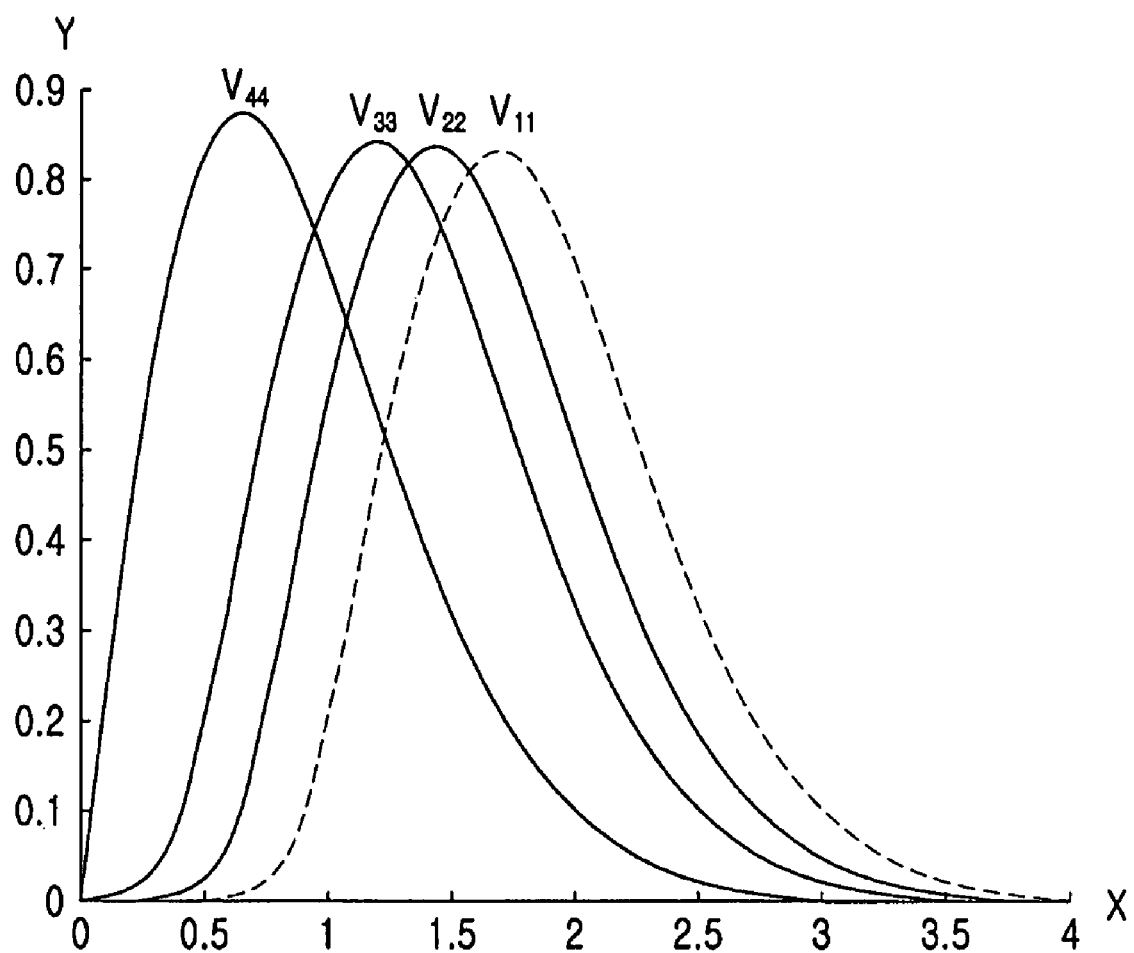
FIG. 3 shows graphs of probability density functions (PDFs) of effective channel gains.

Referring to FIG. 3, an effective channel $V_{11}$ has a high data transmission rate and an effective channel $V_4$ has a low data transmission rate.

It can be seen in FIG. 3 that the channel gain is high as the data transmission rate of an effective channel is high and the channel gain is low as the data transmission rate of the effective channel is low.

Figure 4:
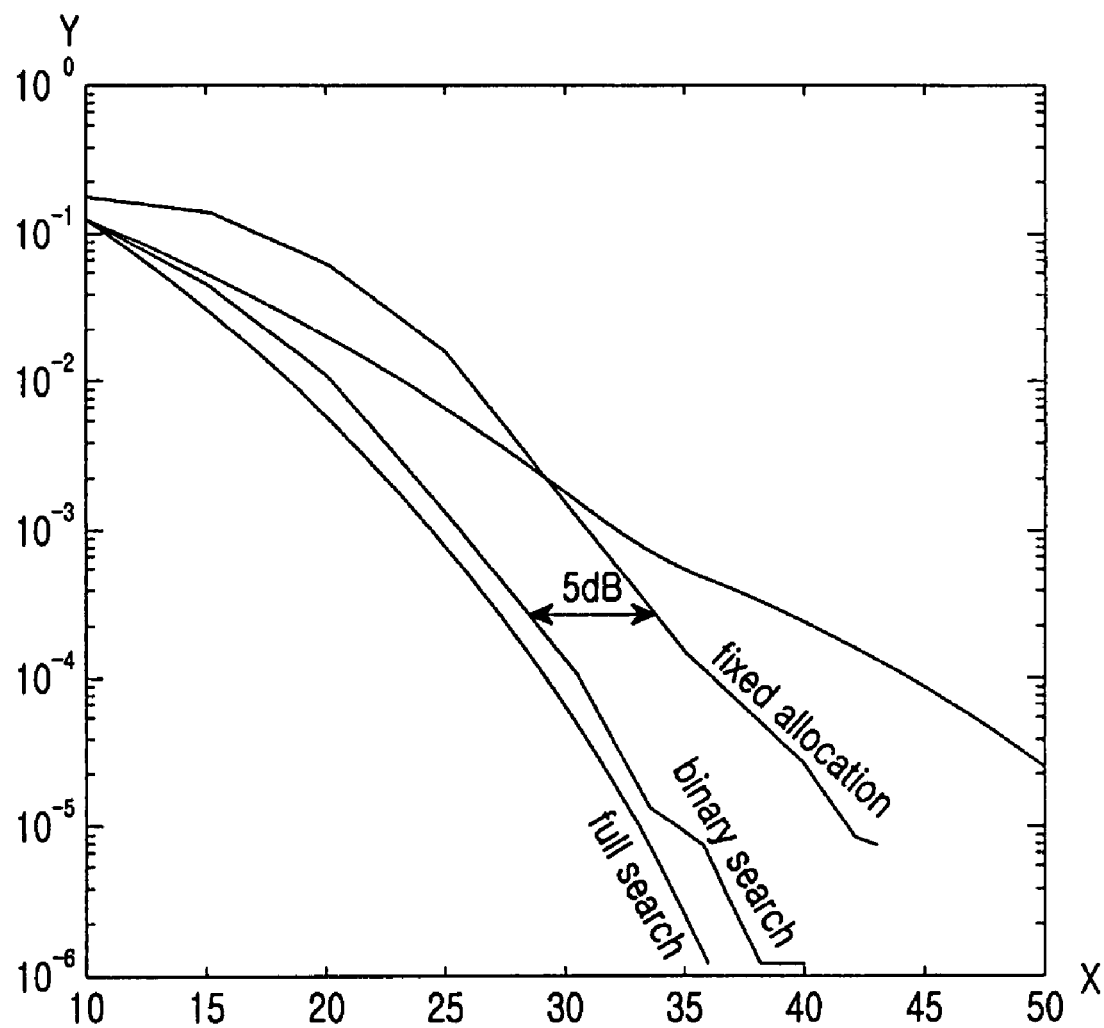
FIG. 4 shows graphs of performance comparison between resource allocation schemes in a multiple-input multiple-output (MIMO) system with two transmit antennas and two receive antennas.

Referring to FIG. 4, the binary search scheme proposed in an exemplary embodiment of the present invention can achieve performance improvement of about 5 dB as compared with the fixed allocation scheme. Also, it can be seen that the performance achievable in the binary search scheme is close to that of the full-search scheme.

Figure 5:
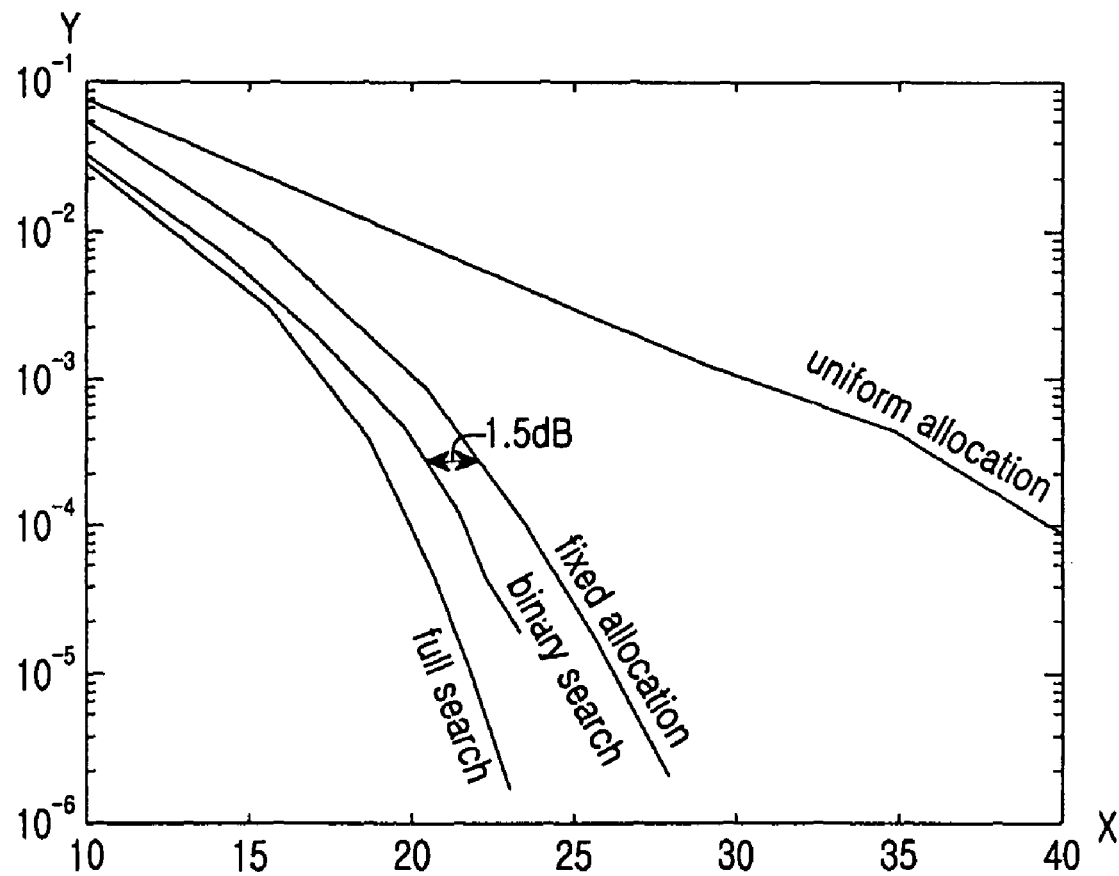
FIG. 5 shows graphs of performance comparison between resource allocation schemes in a MIMO system with four transmit antennas and four receive antennas.

Referring to FIG. 5, it can be seen that the binary search scheme proposed in an exemplary embodiment of the present invention can achieve performance improvement of about 1.5 dB as compared with the fixed allocation scheme.

In FIGS. 4 and 5, modulation schemes of QPSK, 16QAM and 64QAM were used without coding.

As is apparent from the above description, the present invention can generate an optimal reduced search set from a full-search set and can allocate resources using the reduced search set, thereby achieving improved error rate performance as compared with a scheme in which resource allocation is fixed. Error rate performance achieved can approach that of a full-search scheme. Moreover, the present invention can further reduce complexity and the amount of feedback information as compared with the full-search scheme and can outperform the scheme in which the resource allocation is fixed with respect to a channel variation.

While the invention has been shown and described with reference to certain exemplary embodiments of the present invention thereof, it will be understood by those skilled in the art that various changes in form and details may be made therein without departing from the spirit and scope of the present invention as further defined by the appended claims and their equivalents.

What is claimed is:

1. A method for generating a reduced search set in a spatial multiplexing system for simultaneously transmitting independent data streams on an antenna-by-antenna basis, the method comprising:
   estimating, by a channel estimator, channel states with respect to multiple transmit antennas and multiple receive antennas;
   computing, by a detection sequence determination section, energy values required for all assignable data transmission rates on a basis of the estimated channel states;
   selecting, by a search set determination section, a data transmission rate with a smallest energy value of the computed energy values; and
   generating, by a resource allocator, a reduced search set in descending order of the number of selections by periodically repeating the steps.

2. The method of claim 1, wherein the energy values of all the assignable data transmission rates are computed by $$e_k = \Gamma \cdot \sum_{m=1}^{M} \left(2^{r_k^{(m)}} - 1\right) / v_{mm}^2,$$

where $\Gamma$ is a constant determining the signal to noise ratio (SNR) gain and noise variation, $r^{(m)}$ is the data transmission rate allocated to an m-th transmit antenna, and $v_{mm}$ is an over-the-air transmission rate.

3. The method of claim 2, wherein the generating comprises:
   selecting, by the resource allocator, a data transmission rate with a smallest $e_k$, value when the reduced search set is generated; and
   generating, by the resource allocator, the reduced search set in the descending order of the number of selections by recording the number of selections of the data transmission rate with respect to a channel variation.

4. The method of claim 3, wherein the reduced search set is constructed with a data transmission rate having a highest frequency of use when a size of the reduced search set is limited to one element, the data transmission rate being used for every transmission.

5. The method of claim 3, wherein the reduced search set is constructed with two data transmission rates having highest frequencies of use when a size of the reduced search set is limited to two elements, the two data transmission rates being used for every transmission.

6. The method of claim 3, further comprising:
   computing, by the detection sequence determination section, energy required for a current channel using $$e_k = \Gamma \cdot \sum_{m=1}^{M} \left(2^{r_k^{(m)}} - 1\right) / v_{mm}^2$$

with respect to data transmission rates selected by the reduced search set;
   determining, by the detection sequence determination section, a data transmission rate requiring least energy among computed energies; and
   providing, by the detection sequence determination section, a transmitting side with index information mapped to the determined data transmission rate.

7. An apparatus for generating a reduced search set in a spatial multiplexing system for simultaneously transmitting independent data streams on an antenna-by-antenna basis, the apparatus comprising:
   a channel estimator for estimating channel states with respect to multiple transmit antennas and multiple receive antennas;
   a detection sequence determination section for computing energy values required for all assignable data transmission rates on a basis of the estimated channel states;
   a search set determination section for selecting a data transmission rate with a smallest energy value of the computed energy values and generating a reduced search set in descending order of the number of selections of data transmission rates; and
   a resource allocator for allocating resources on a transmit antenna-by-transmit antenna basis using the generated reduced search set,
   wherein index information indicating the generated reduced search set is transmitted to a transmitting side.

8. The apparatus of claim 7, wherein the energy values of all the assignable data transmission rates are computed by $$e_k = \Gamma \cdot \sum_{m=1}^{M} \left(2^{r_k^{(m)}} - 1\right) / v_{mm}^2,$$

where $\Gamma$ is a constant determining a signal to noise ratio (SNR) gain and a noise variation, $r^{(m)}$ is a data transmission rate allocated to an m-th transmit antenna, and $v_{mm}$ is an over-the-air transmission rate.

9. The apparatus of claim 8, wherein when the number of data transmission rates constructing the reduced search set is set to 2, the reduced search set is determined by $E[e_1|e_1<e_2]+E[e_2|e_1>e_2]$.

10. The apparatus of claim 9, wherein a data transmission rate to be used between two data transmission rates constructing the reduced search set is determined by $r_1$ if $e_1<e_2$ and $r_2$ if $e_1>e_2$.

11. A method of a transmitter for generating a reduced search set in a spatial multiplexing system for simultaneously transmitting independent data streams on an antenna-by-antenna basis, the method comprising:
   estimating channel states with respect to multiple transmit antennas and multiple receive antennas;
   computing energy values required for all assignable data transmission rates on a basis of the estimated channel states;

selecting a data transmission rate with a smallest energy value of the computed energy values;
generating a reduced search set in descending order of the number of selections by periodically repeating the steps; and determining the data transmission rate to be allocated to each antenna based on the generated reduced search set.

* * * * *